United States Patent

Xia et al.

[11] Patent Number: 6,110,442
[45] Date of Patent: Aug. 29, 2000

[54] METHOD OF PREPARING $LI_x MN_2O_4$ FOR LITHIUM-ION BATTERIES

[75] Inventors: Dinggue Xia; Qingguo Liu, both of Beijing, China

[73] Assignee: Hughes Electronics Corporation, El Segundo, Calif.

[21] Appl. No.: 09/042,671

[22] Filed: May 30, 1997

[51] Int. Cl.[7] .................................................. C01G 45/12
[52] U.S. Cl. ..................... 423/599; 429/224; 429/231.95
[58] Field of Search .................... 423/599, 600, 423/605, 641; 429/209, 212, 224, 231.95; 252/182.1

[56] References Cited

U.S. PATENT DOCUMENTS

| | | | |
|---|---|---|---|
| 3,330,697 | 7/1967 | Pechini . | |
| 5,211,933 | 5/1993 | Barboux . | |
| 5,266,299 | 11/1993 | Tarascon . | |
| 5,478,671 | 12/1995 | Idota | 429/194 |
| 5,478,673 | 12/1995 | Funatsu | 429/197 |
| 5,565,688 | 10/1996 | Hayashi | 252/182.1 |
| 5,571,637 | 11/1996 | Idota | 429/218 |
| 5,693,307 | 12/1997 | Bowden et al. | 423/599 |
| 5,702,679 | 12/1997 | Sheargold et al. | 423/599 |
| 5,738,957 | 4/1998 | Amine et al. | 429/223 |
| 5,742,070 | 4/1998 | Hayashi et al. | 252/182.1 |
| 5,770,118 | 6/1998 | Saidi | 204/157.15 |
| 5,807,532 | 9/1998 | Takahashi et al. | 423/599 |
| 5,820,790 | 10/1998 | Amine et al. | 252/519.1 |
| 5,824,285 | 10/1998 | Koksbang | 423/599 |
| 5,882,218 | 3/1999 | Reimers | 429/224 |

OTHER PUBLICATIONS

Liu, "Synthesis and Electrochemical Studies of Spinel Phase LIMN204 . . . " Jour. Electrochemical Soc. vol. 143, No. 3, p. 879 (1996).

Zhang, "Synthesis of YBaZCu307–X . . . " J. Mater, Res. vol. 5, No. 9, p. 1806 (1990).

Chu, "Preparation of High–Tc Superconducting Oxides . . . " J. Amer. Ceram. Soc., 70 C–375 (1987).

Primary Examiner—Tom Dunn
Assistant Examiner—Cam N. Nguyen
Attorney, Agent, or Firm—Bradley K. Lortz; Vijayalakshmi D. Duraiswamy; Michael W. Sales

[57] ABSTRACT

A method of preparing $Li_xMn_2O_4$ for a secondary battery includes mixing lithium nitrate, magnanese nitrate and citric acid. A complex citrate solution is formed in the substantial absence of a polyhydroxyl alcohol. The complex citrate solution is dehydrated to produce a precursor. The precursor is then heated at a substantially constant rate and then calcined to provide a spinel compound.

19 Claims, 5 Drawing Sheets

METHOD OF PREPARING $LI_X MN_2O_4$ FOR LITHIUM-ION BATTERIES

BACKGROUND OF THE INVENTION

1. Field of the Invention

The present invention generally relates to electrode materials for batteries and, more particularly, to an inexpensive method of preparing $Li_xMn_2O_4$ for lithium-ion batteries.

2. Description of Related Art

The use of lithium-ion batteries has continued to increase for many applications. $LiCoO_2$ has been used extensively as an intercalation cathode material in lithium-ion batteries. But due, in part, to the high cost of production and the toxicity of $LiCoO_2$, spinel structure $Li_xMn_2O_4$ has become increasingly considered as an alternate intercalation cathode material for secondary lithium-ion batteries. The use of $Li_xMn_2O_4$ is advantageous not only because it is non-toxic but also due to its performance characteristics, including reliability, long cycle life, high cell capacity, high energy density, and safety.

The performance characteristics of $Li_xMn_2O_4$ are important for a wide range of uses, such as in cellular telephones, military devices, automobiles, and even space satellites. However, as the scale of usage and volume of production increases, the time and cost involved in producing the $Li_xMn_2O_4$ becomes of increasing significance.

Some of the past processes for preparing lithium maganese oxides have been based on what is referred to as the "Pechini process." That process is described by Pechini in U.S. Pat. No. 3,330,697 whereby alkaline earth titanates, zirconates and niobates are prepared using alpha-hydroxycarboxylic acids, such as citric and lactic acids. Polybasic acid chelates are formed between those acids and titanium, zirconium, and niobium. The chelates then undergo esterification when heated with a polyhydroxyl alcohol. Thereafter, the excess polyhydroxyl alcohol is removed.

An example of using the Pechini process to make spinel $Li_xMn_2O_4$ is shown by Liu et al. in "Synthesis and Electrochemical Studies of Spinel Phase $Li_xMn_2O_4$ Cathode Materials Prepared by the Pechini Process" Journal of the Electrochemical Society, Vol. 143, No. 3, pp. 879–884 (1996). Liu et al. point out that, in the past, $Li_xMn_2O_4$ has been synthesized by the mixing of oxides and/or carbonates followed by high temperature firing and extended grinding. However, as further pointed out by Liu et al., those conditions may result in nonhomogeneity, abnormal grain growth, and poor control of stoichiometry. Therefore, Liu et al. dissolved metal nitrates in a mixture of citric acid and ethylene glycol. A clear solution was then produced by heating the mixture. The clear solution was further heated at a higher temperature to induce esterification and distill out excess ethylene glycol, which resulted in a viscous solution. That viscous solution was vacuum dried to yield a polymer foam. The foam was calcined at temperatures between 250 to 800 degrees C. for a few hours.

Another method for preparing lithium oxides is described in U.S. Pat. No. 5,211,933 wherein a sol-gel process is utilized. Manganese or cobalt acetates are hydrolized with lithium and ammonium hydroxides. Thereby, a gelatinous precipitate is formed and then heated to form a xerogel. And in U.S. Pat. No. 5,266,299, a method of preparing a lithium manganese oxide includes reacting $LiMn_2O_4$ with LiI in an evacuated container, heating it, and then washing it to remove unreacted LiI. Alternatively, the same mixture could be refluxed in acetonitrile, filtered, and then washed.

As can be seen, there is a need for improved methods of preparing electrode materials for batteries and, in particular, an inexpensive method of preparing $Li_xMn_2O_4$ for lithium-ion batteries that reduce the number of processing steps and other required chemicals to thereby reduce the overall production costs.

SUMMARY OF THE INVENTION

The present invention is directed to a method of preparing cathode materials for batteries. More specifically, the present invention satisfies the need of preparing such compounds, particularly $Li_xMn_2O_4$ and $Li_xMn_yO_4$, in a fashion that minimizes intermediate steps and chemicals with an accompanying reduction in overall cost. The improved method of the present invention includes mixing nitrate compounds in the substantial absence of polyhydroxyl alcohol or glycol compounds. The nitrates can include lithium nitrate and maganese nitrate, with an atomic ratio of Li to Mn being around 0.4 to 0.7. Also, citric acid can be added in a molar ratio of the acid to the combined nitrates of around 0.5 to 1.5. A complex solution is formed from the nitrates and acid, and it is then dehydrated to produce a precursor. The dehydration can occur at about 40 to 150 degrees C. The precursor is thereafter calcined at around 350 to 900 degrees C. to provide a spinel $Li_xMn_2O_4$ compound.

These and other features, aspects and advantages of the present invention will become better understood with reference to the following drawings, description, and claims.

DESCRIPTION OF THE PREFERRED EMBODIMENTS

Figure 1:
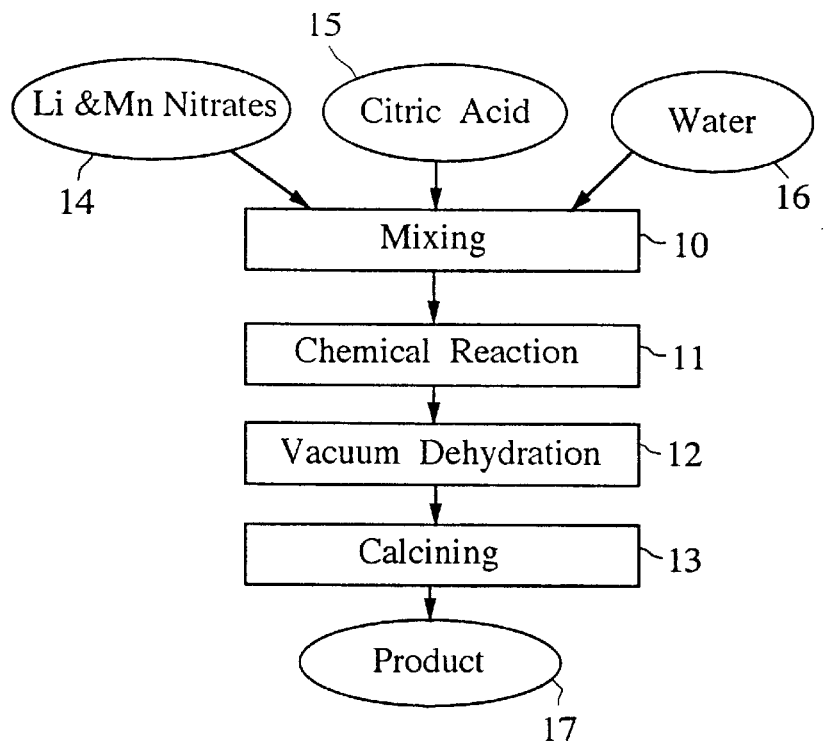
FIG. 1 is a flowchart depicting the steps of an embodiment of the present invention.

The overall steps of an embodiment of the present invention to prepare $Li_xMn_2O_4$ and, more specifically $Li_xMn_2O_4$ for use as an intercalation compound in an electrode of a battery or cell is shown in FIG. 1. Initially, a combination of metal nitrate compounds 14, an acid 15, and water 16 are mixed together, as indicated in step 10 of FIG. 1. The mixing step 10 provides a chemical reaction step 11 that produces an intermediate, complex solution. The complex solution is then vacuum dehydrated, as shown in step 12 of FIG. 1, to produce a precursor compound. The precursor is then subjected to a calcining step 13, which includes pyrolysis and oxidation of the precursor. The resulting $Li_xMn_2O_4$ or final product 17 can then be mixed with appropriate binders to form, for example, a cathode composite film, as is well known in the art.

More specifically, and in an embodiment of the present invention, the compounds 14 include lithium nitrate (anhydrous, analytical pure grade) and maganese nitrate (analytical pure grade, 50% water solution). According to this embodiment of the invention, it is preferred that the starting atomic ratio of Li to Mn be in the range of about 0.4 to about 0.7. Optimally, the Li to Mn atomic ratio is about 0.55. If the atomic ratio is outside such preferred range, the spinel structure is more difficult to produce without undesirable phases of $Li_xMn_2O_4$.

To the nitrate combination 14 is added a carboxylic acid 15, such as citric or lactic acid. In this embodiment of the invention, the acid 15 is citric acid. Preferably, a molar ratio of the citric acid 15 to the combined metal components (lithium and maganese) is about 0.5 to about 1.5. For this embodiment of the invention, an optimal molar ratio is about 1.0. Generally, if the molar ratio is less than about 0.5, then the formation of the intermediate complex solution mentioned above becomes more difficult in terms of the reaction going to completion. On the other hand, if the molar ratio is above about 1.5, then the subsequent dehydration step 12 is more difficult in terms of having to burn off excess acid.

The water 16 (preferably deionized) is also added to the nitrate combination 14 and citric acid 15, and all three of those components are stirred, as indicated as step 10 in FIG. 1. Those three components are mixed and stirred in the absence of other chemicals, such as polyhydroxly alcohols (i.e., glycols) and hydroxides which have been used in the past to provide esterification and hydrolysis, respectively, in producing an intermediate, complex solution. Thereby, the number of processing steps and the number of chemicals is reduced.

Upon appropriate stirring, the mixing step 10 creates a chemical reaction step 11 which, in this embodiment, results in the formation of a citrate complex solution. That complex solution is characterized by the metals chelating with the acid. The necessary amount of stirring is dictated by when the citrate complex becomes substantially homogeneous in mixture upon visual inspection. If the citrate complex solution is not substantially homogeneous, then the final product 17 may be lacking in the desired particle size and structure.

After forming the citrate complex solution, the low temperature, dehydration step 12 is carried out. Preferably, under this embodiment of the invention, dehydration occurs at a temperature range of about 40 to 150 degrees C, with the optimum temperature being about 75 degrees C. Temperatures below that preferred range cause an increase in time for the dehydration step 12. Temperatures above the preferred range tend to cause the reaction to become too violent.

Excess water is removed from the citrate complex solution by an evaporator, for example. Such occurs under vacuum of about 1.0 to 10.0 mm of Hg and until the complex solution becomes a heavy, viscous fluid. The point at which the complex solution adequately reaches such viscous state is based upon visual inspection. However, the step of producing the viscous fluid is primarily to allow for easy transfer of the fluid to an appropriate vessel that can be further heated under a higher vacuum. Accordingly, the step of producing the viscous fluid is not an essential one and can be eliminated if the dehydration step 12 is initially carried out in a vessel that can withstand the higher temperature and vacuum described below.

The viscous fluid from the above dehydration can be transferred to a vessel and further dehydration occurs in a vacuumed oven. This step of further dehydration can occur at varying temperatures, times periods, and vacuum. Preferably, the variance ranges from around 40 degress C for about 6 hours to 75 degrees C. for about 2 hours and up to around 150 degrees C. for about 0.5 hours, all of which occurs while under a vacuum of about 0.1 to 0.01 mm of Hg. Furthermore, the above dyhydration times can be extended, such as by two times at 40 degrees C and six times at 150 degrees C. The completion of the dehydration step produces a precursor which is very porous, amorphous, homogeneous in mixture, and a solid-like foam. According to this embodiment, homogeneity provides better uniformity of particle size in the final product 17. The desired characteristics can be confirmed by x-ray diffraction for amorphism. In particular, according to an embodiment of this invention, x-ray diffraction showed no gamma- $Mn_2O_3$. The other characteristics of porosity, homogeneity and foam-like can be confirmed by visual inspection.

Next, the calcining step 13, as indicated in FIG. 1, is a single step but still includes the two steps pyrolysis and oxidation of the foam precursor. According to an embodiment of the present invention, the calcining step is carried out in an air or oxygen atmosphere. The precursor is preferably heated at a rate of about 3 to 10 degrees C/minute until a fixed temperature is reached. If not heated at a substantially constant rate, then there is a loss of control of particle size in the final product 17. Further, under this embodiment of the invention, the particle size of the final product 17 (FIG. 1) varies not only with the heating rate but also a fixed or holding temperature described below. At a heating rate above the preferred range and a fixed temperature below the preferred range described below, the particle size decreases.

Upon the precursor being heated at a substantially constant rate, a fixed temperature is reached around the precursor. Preferably, the fixed temperature is about 350 to 900 degrees C. X-ray diffraction of the final product 17 (FIG. 1) which had been heated up to 700 degrees C. had major peaks on the spectra, all of which corresponded to spinel $Li_xMn_2O_4$ structure. According to analysis by scanning electron microscopy (SEM) and transmission electron microscopy (TEM), at lower pyrolysis temperatures, traces of other material may be present. For example, pyrolysis at about 350 degrees C. resulted in a second phase layer on the final product 17 which was not found when pyrolysis occurred between about 600 to 800 degrees C. In any event, after the fixed temperature is reached, such temperature is then held for about 1 to 10 hours. Optimally, the precusor is heated at a rate of about 4 degrees C/minute, the fixed temperature is about 800 degrees C, and the fixed temperature is held for about 4 hours. Thereby, the particle size distribution of the final product 17 typically peaks at about 3.0–5.0 microns. After the precursor is held at the fixed temperature for the appropriate time, the precusor is slowly cooled without temperature quenching.

EXAMPLES

Table 1 below shows six different compositions of $Li_xMn_2O_4$ and denoted A through F. The compositions were based on different starting atomic ratios of Li to Mn. The six samples were dehydrated at 75 degrees C. for 12 hours in vacuum and calcined at 800 degrees C. for 4 hours in air.

TABLE 1

| No | Starting Li/Mn | Li wt % | Mn wt % | Others | Li/Mn | Formula |
|---|---|---|---|---|---|---|
| A | 1.4:2 | | | | | |
| B | 1.2:2 | 4.156 | 59.83 | 36.01 | 1.1:2 | $Li_{1.06}Mn_{1.94}O_4$ |
| C | 1.1:2 | 3.83 | 60.11 | 36.06 | 1.01:2 | $Li_{0.98}Mn_{1.94}O_4$ |
| D | 1.06:2 | 3.76 | 60.78 | 35.46 | 0.98:2 | $Li_{0.96}Mn_{2.0}O_4$ |
| E | 1.0:2 | 3.56 | 61.25 | 35.19 | 0.92:2 | $Li_{0.93}Mn_{2.03}O_4$ |
| F | 0.8:2 | Not available | Not available | Not available | Not available | Not available |

Header note: ICP Chemical Analyses

As can be seen from Table 1, "x" in $Li_xMn_2O_4$ ranged from about 0.93 to about 1.06 while "y" ranged from about 1.94 to about 2.03. Compositions C and D gave final products closest to stoichiometric $Li_xMn_2O_4$.

Cathode Electrode Fabrication

Three different binders were used to make $Li_xMn_2O_4$ cathode films, with each containing 10% by weight of acetylene black. Binder #1 was a Teflon colloid suspension (60 wt. % of Teflon in water ). Binder #2 was a polyvinylidene fluoride (PVDF) powder. Binder #3 was a mixture of PVDF and ethylene-propylene copolymer (EP rubber).

For binder #1, the amount of Teflon colloid suspension was in the range of 3–12 wt. % of $LiMn_2O_4$ with 7.0–8.0 wt. % being the optimum range. The optimum amount of Teflon (excluding water) was about 4.2–4.8 wt. % of $Li_xMn_2O_4$. If the amount of Teflon (from the colloid suspension) was less than about 3 wt. % of $Li_xMn_2O_4$ it was difficult to make a composite film by using a rolling technique, which is well known in the art. In other words, the film does not have sufficient tension to roll into a spirally wound cylindrical battery. When the amount of Teflon was over about 12 wt. % of $Li_xMn_2O_4$, the composite cathode film was easier to make but the Teflon insulates the active $Li_xMn_2O_4$ particles and the reversible capacity is thereby decreased. In this instance, alcohol was used as a diluent. The $Li_xMn_2O_4$ and acetylene black were mixed, those were mixed with the Teflon colloid suspension, and the alcohol was added to form a uniform slurry. After the alcohol and water were evaporated by heating with an infrared lamp, the slurry became a heavy viscous mud cake. That was passed between two rollers to form films 100–300 micrometers thick. These films were then completely dried at 120 degrees C. in a vacuum of less than about $10^{-2}$ mm of Hg for 24 hours.

Binder #2 showed less adhesive ability than Binder #1. A flat plate press, as is known in the art, was used to make the cathode films using binder #2. The amount of PVDF used was in the range of about 3–12 wt. % of the $Li_xMn_2O_4$, with the optimum range being about 4–5 wt. %. The PVDF was dissolved in N-methyl pyrrolidinone, and that solution was mixed with the powder mixture of $Li_xMn_2O_4$ and acetylene black. That combination was pressed flat with a pressure of about 100 kg/cm². The pressed film was treated in a vacuum of less than $10^{-2}$ mm of Hg at 120 degrees C. for 24 hours to complete the removal of the solvent and moisture.

Binder #3, which was a combination of PVDF and EP, was used to improve the adhesive quality of PVDF. The content of EP was in the range of about 2–10 wt. % of $Li_xMn_2O_4$, with an optimum range being about 3–5 wt. %. Both techniques of rolling and pressing were used to make the cathode films with binder #3. PVDF was first dissolved in N-methyl pyrrolidinone, and EP was dissolved in hexane. The two solutions were mixed together, and then they were mixed with the $Li_xMn_2O_4$ and acetylene black. The rolled or pressed films were treated in a vacuum of less than $10^{-2}$ mm of Hg at 120 degrees C. for 24 hours to complete the removal of the solvent and moisture.

The composite cathode films made with the above three binders showed good reversibility and performance. The weight density of the composite films varied with the techniques used. The rolling technique gave a weight density of about 1.2–1.3 g/cm³. The pressed films had a density of about 1.4–1.6 g/cm³, depending upon the pressure. The cathode film containing 4 wt. % PVDF and pressed at 100 kg/cm² had a density of 1.45 g/cm³.

Button Test Cell Assembly

Lithium was used as the anode with a 150 micrometer thick foil to assure an excess of starting capacity compared to the $Li_xMn_2O_4$ cathode. The surface of the lithium metal film was scraped with a knife to remove its oxidized layer. Electrolytes were prepared in a nitrogen-flushed dry box. The solvents used included propylene carbonate (PC), ethylene carbonate (EC), dimethoxyethane (DME), and dimethyl carbonate (DMC). The solvents were each purified by two successive distillations, followed by redistillation after adding fresh pieces of lithium metal. The water content in the solvents was less than 10 ppm, as measured by the Karl-Fisher method. The crown ether 12-crown4 from Aldrich Co. was treated with fresh lithium pieces. The $LiClO_4$ salt was dried at 140 degrees C. for 24 hours in a vacuum of less than $10^{-2}$ mm of Hg. The $LiPF_6$ was dried at 80 degrees C. for 24 hours in a vacuum of less than $10^{-2}$ mm of Hg. The weighed lithium salt was put into selected amounts of the mixed solvents, and this was shaken until the salt was completely dissolved. The electrolytes listed in the following Table 2 were studied.

TABLE 2

| No. | Salt | Main Solvents (Ratio) | Added Solvent |
|---|---|---|---|
| I | 1M $LiClO_4$ | PC:EC:DME (4:3:3) | |
| II | 1M $LiClO_4$ | PC:EC:DME (1:1:2) | |
| III | 1M $LiClO_4$ | EC:DME (1:1) | |
| IV | 1M $LiPF_6$ | EC:DMC (1:1) | |
| V | 1M $LiPF_6$ | EC:DMC (1:1) | +0.5M 12-Crown-4 |
| VI | 1M $LiClO_4$ | EC:DMC (1:1) | |
| VII | 1M $LiClO_4$ | EC:DMC (1:1) | +0.5M 12-Crown-4 |
| VIII | 1M $LiClO_4$ | EC:DMC (2:3) | |

The results in the test cells showed that electrolyte #II gave the best performance. Electrolyte #II had lower viscosity and better wettability of the cathode and separator films.

Two kinds of separators were used in the test cell assembly. One was Celgard 2500 microporous polypropylene (Hoechst Celanese Corp.), and the second one was polypropylene felt with a thickness of 0.02 mm. The Celgard was stronger than the other separator, but the other separator could absorb more electrolyte solution. Both separators were cut into discs of 15 mm diameter, washed with distilled water and absolute alcohol, and then dried at 50 degrees C. for about 10 hours.

The test cell assembly was constructed with stainless steel 303 and designed based upon the combination of disclosures shown in Journal of Electrochemical Society, Vol. 137, No. 7, p. 2009 (1990) and Journal of Electrochemical Society, Vol. 139, No. 4, p. 937 (1992). The test cell assembly was sealed by a silicon rubber O-ring. Spring loading was used to keep contact between the electrodes, separator and current collectors (with the stainless steel bottom and cover of the test cell assembly also being used as current collectors). A constant pressure of 5 kg was provided by the spring to press the battery sandwich together. The cathode composite film was immersed in the electrolyte solution to ensure that all micropores of the film were filled with the solution.

The test cell assembly was assembled in a dry box. In the test cells with a lithium metal anode, a 1 $cm^2$ piece of clean lithium film was put into the bottom of the cell assembly, and two pieces of separator (one each of the Celgard 2400 and the polypropylene felt) were placed on top of the lithium. The cathode film was placed on top of the separators, and the electrolyte solution was added. The cell was sealed by fastening the top against the spring and the O-ring. The typical area of the test cell was 1.2 $cm^2$, with a constant pressure of 4.16 $kg/cm^2$. Test cells with carbon anode materials were similarly made, using either petroleum coke or graphite. The petroleum coke was mixed with 4 wt. % acetylene black and 5 wt. % Teflon (from an emulsion containing 60% PTFE), and the composite was pressed into a film of about 100–120 mm thickness. Water was removed by heating the film for 20 hours in a vacuum of less than $10^{-2}$ of HG.

Test Results With Lithium Metal Anode

Cyclic voltammetry test results with a lithium metal anode used a scanning rate of 0.1 mV/s. Composition C (Table 1) and binder #1 under a rolling technique were used. The binder included 10 wt. % acetylene black and 5 wt. % Teflon. The voltammetry results showed that the electrolyte #II had a higher capacity than electrolytes #I and #III (Table 2). Electrolyte #III, upon testing, showed a faster decay of capacity with cycling than electrolyte #II or #II. The same was probably due to the absence of propylene carbonate (PC) which can form a good passivation layer on the lithium metal.

Figure 2:
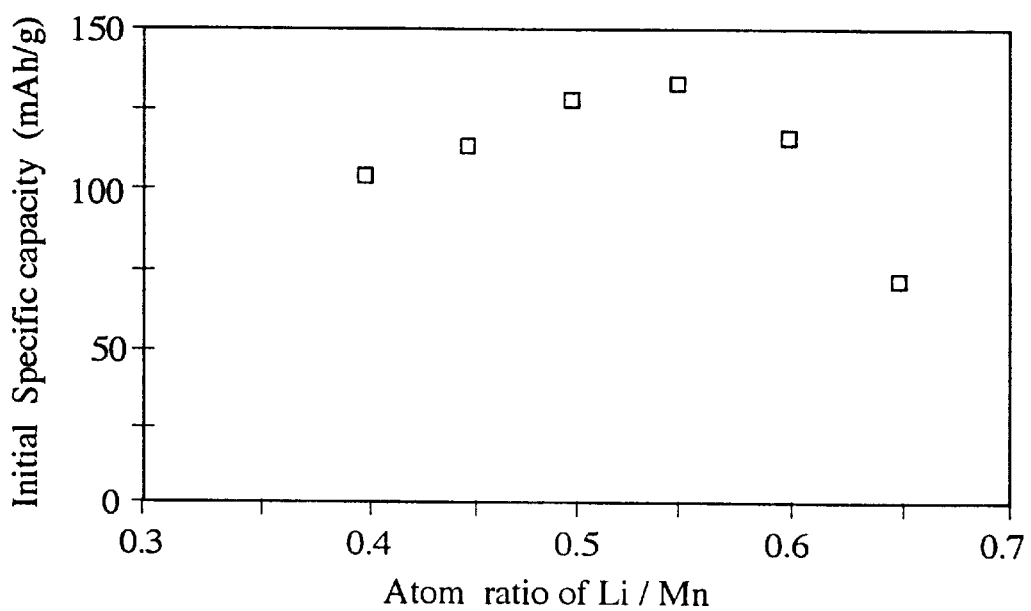
FIG. 2 is a graph of atomic ratio of Li/Mn versus initial specific capacity of a cell constructed with the $Li_xMn_2O_4$ produced according to the steps shown in FIG. 1.

FIG. 2 shows the effect of the initial atomic ratio of Li/Mn on the initial specific capacity of a $Li_xMn_2O_4$ composite film. Under FIG. 2, the $Li_xMn_2O_4$ samples were made with binder #1 under a rolling technique. According to an embodiment of the invention, the samples were dehydrated at 75 degrees C. for 12 hours in a vacuum, and then calcined at 800 degrees C. for 4 hours in air. Electrolyte #II was used in the test cell assembly. FIG. 2 shows that a starting Li/Mn atomic ratio of about 0.55 produced the highest capacity, with an optimum range of atomic ratio being about 0.5–0.6.

Figure 3:
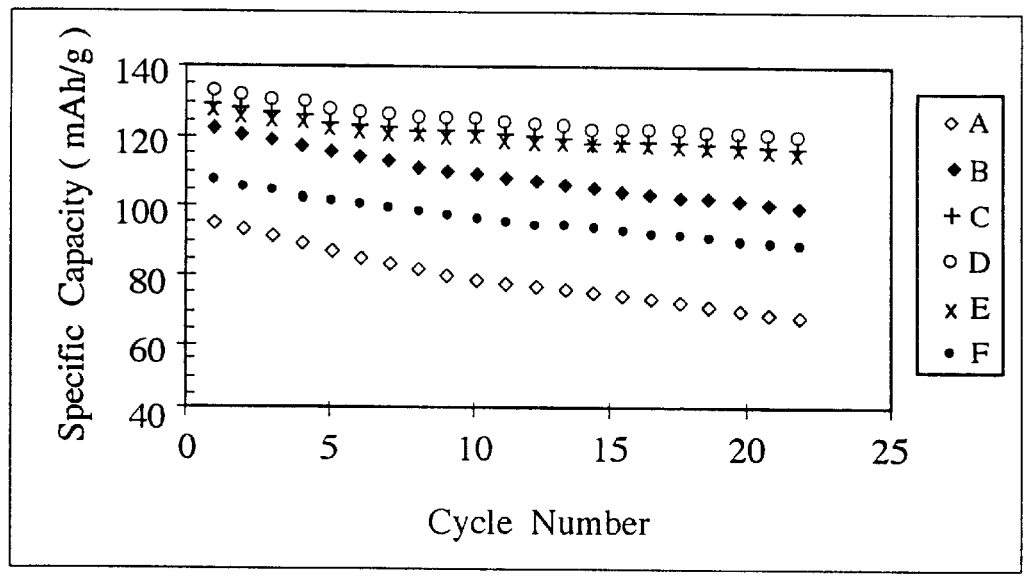
FIG. 3 is a graph of cycle number versus specific capacity of a cell with different compositions of $Li_xMn_2O_4$ produced according to the steps shown in FIG. 1.

FIG. 3 shows the different compositions A–F (Table 1) over increasing cycles. The compositions A–F, which were prepared according to an embodiment of this invention, were dehydrated at 75 degrees C. for 12 hours and then calcined at 800 degrees C. for 4 hours. The test cell used a film including binder #I, 85% $Li_xMn_2O_4$, 10% acetylene black, 5% Teflon, electrolyte #VI, and a Celgard 2400 separator. The test cell was charged and discharged at a constant current density of 0.3 $mA/cm^2$ between a voltage range from 3.30 to 4.35 V. As shown in FIG. 3, the three top curves are from compositions D, C, and E, respectively. Compsition D showed the highest capacity with cycling.

Figure 4:
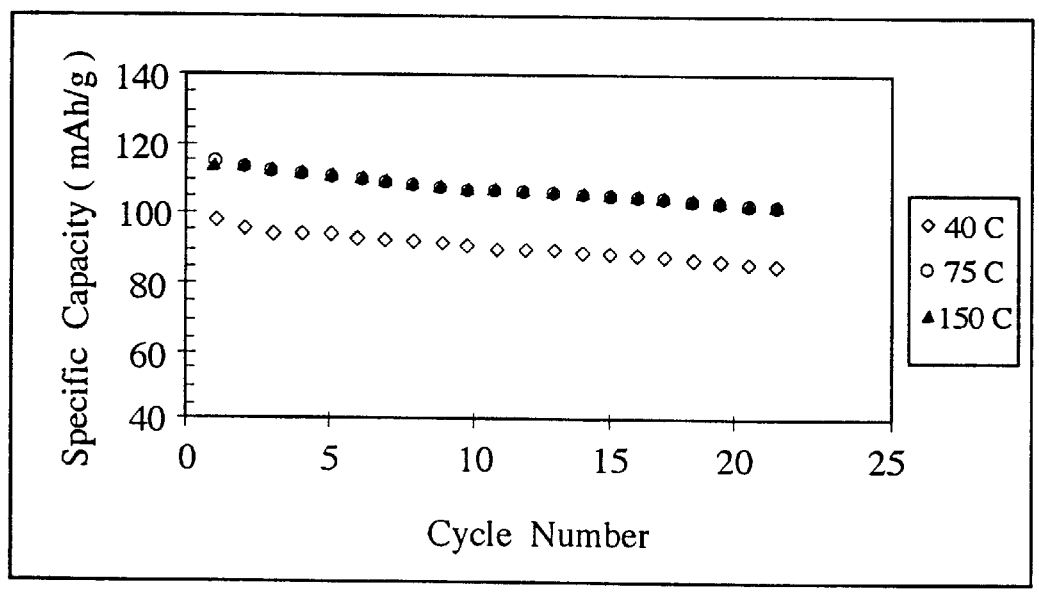
FIG. 4 is a graph of cycle number versus specific capacity of a cell with the composition of $Li_xMn_2O_4$ being produced at different dehydration temperatures according to the steps shown in FIG. 1.

FIG. 4 shows the effects of temperature during dehydration, according to an embodiment of the present invention. Composition D (Table 1) was dehydrated for 12 hours at temperatures of 40, 75, and 150 degrees C, and then calcined at 350 degrees C. for 4 hours. The test cells were made with binder #I and electrolyte #VI. At 40 degrees C, the formed precursor was a yellow hardened plate. At a 70 degree C dehydration temperature, the precusor was a light yellow porous foam. At 150 degrees, the precusor was a gray, porous foam. Above 150 degrees, a violent reaction occurred. According to this invention, the foam-like precusor is preferred because the distribution of Mn and Li is uniform and the oxidation is easier, which enables the formation of fine particle, small crystals of spinel $Li_xMn_2O_4$ on calcination. FIG. 4 shows that the $Li_xMn_2O_4$ dehydrated at 75 and 150 degrees C were almost identical, but that which was dehydrated at 40 degrees C. had less desirable characteristics.

Figure 5:
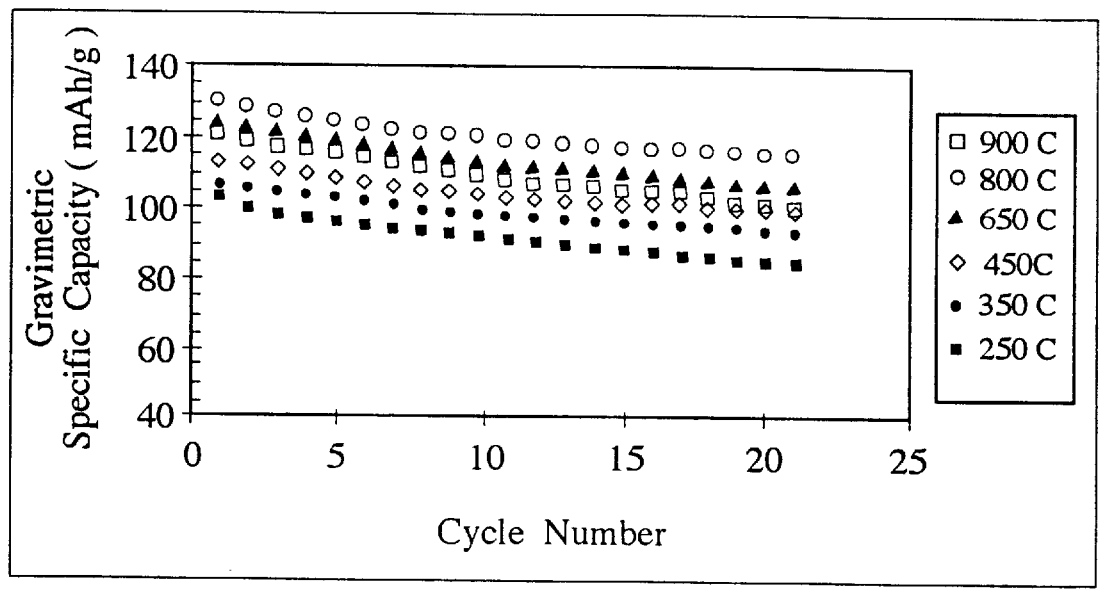
FIG. 5 is a graph of cycle number versus gravimetric specific capacity of a cell with the composition of $Li_xMn_2O_4$ being produced at different calcination temperatures according to the steps shown in FIG. 1.
Figure 6:
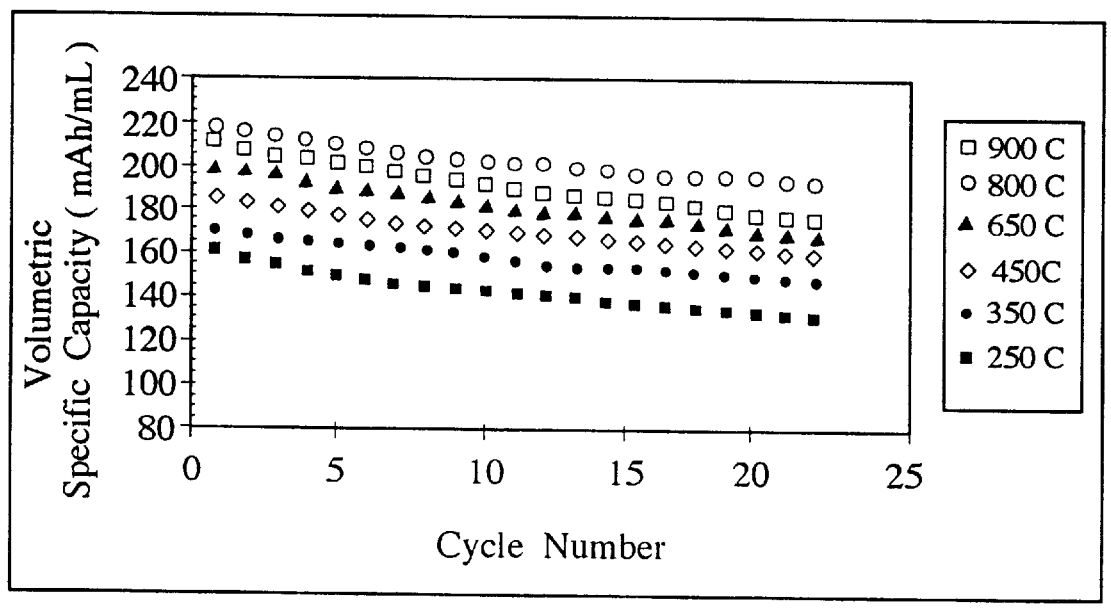
FIG. 6 is a graph of cycle number versus volumetric specific capacity of a cell with the composition of $Li_xMn_2O_4$ being produced at different calcination temperatures according to the steps shown in FIG. 1.

FIG. 5 shows the test results of different calcining temperatures on composition D (Table 1), according to an embodiment of the present invention. Composition D was dehydrated at 75 degrees C. and calcined for 4 hours at temperatures ranging from 250 to 900 degrees C. The test samples were prepared in the same manner as that for FIG. 3. While FIG. 5 shows the gravimetric specific capacities at different calcining temperatures, FIG. 6 shows the same, except based upon volumetric specific capacity. As shown in FIGS. 5 and 6, calcining at 800 degrees C. gave the highest capacities and cycling performance. Calcination temperatures of 900, 650, and 450 degrees C. were the next best. Calcination temperatures of 350 and 250 degrees C. gave the poorest results.

Figure 7:
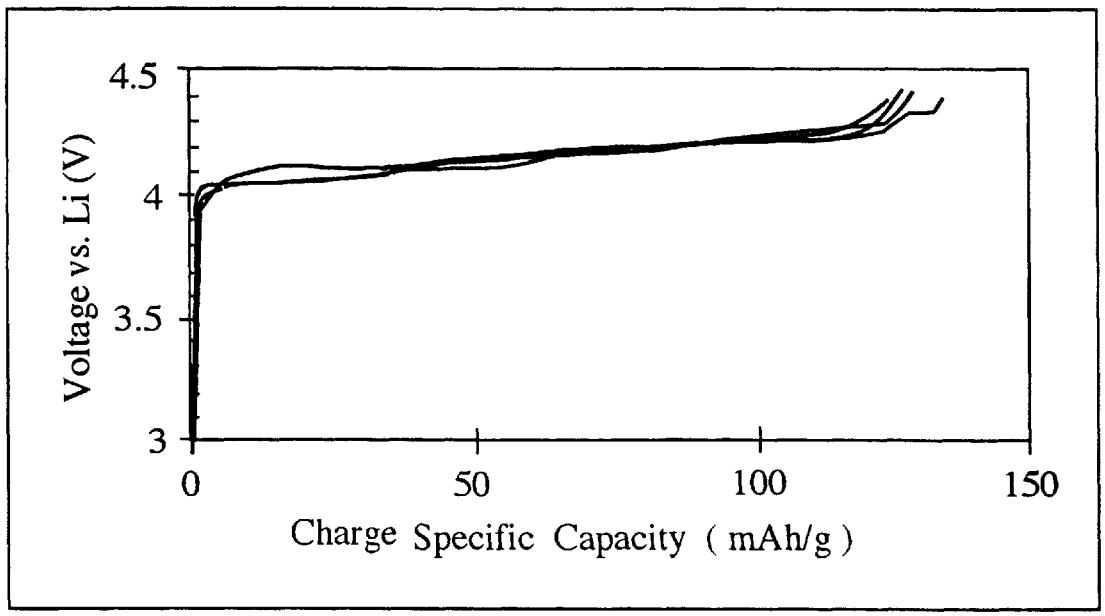
FIG. 7 is a graph of charge specific capacity versus voltage of a cell at the first, second, tenth and twentieth cycles wherein the composition of $Li_xMn_2O_4$ was produced at a calcination temperature of 800 degrees C. according to the steps shown in FIG. 1.
Figure 8:
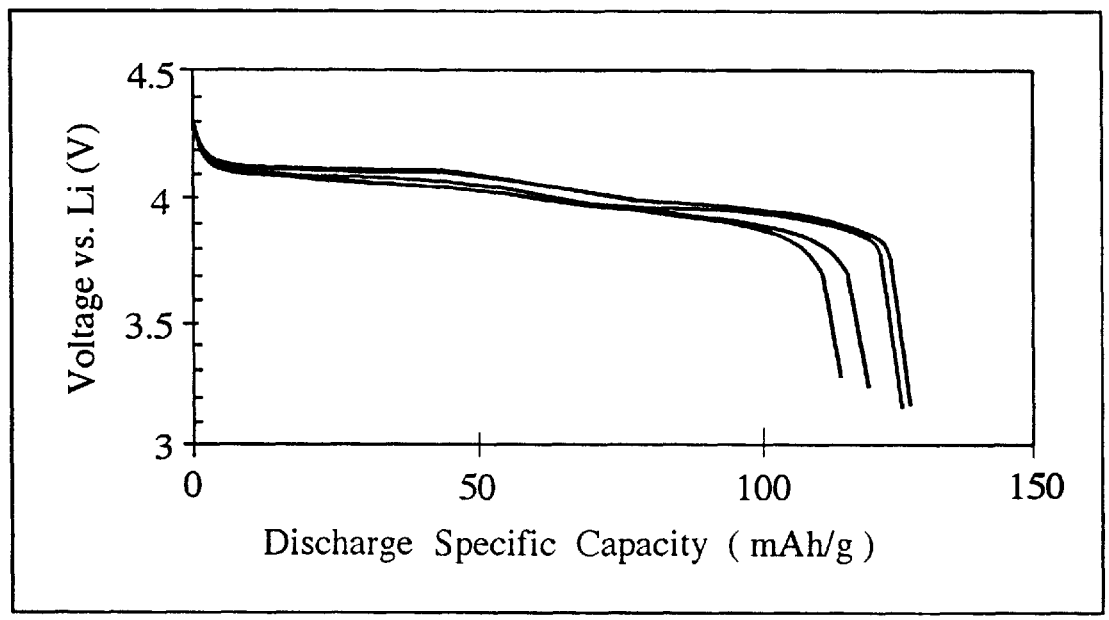
FIG. 8 is a graph of discharge specific capacity versus voltage of a cell at the first, second, tenth and twentieth cycles wherein the composition of $Li_xMn_2O_4$ was produced at a calcination temperature of 800 degrees C. according to the steps shown in FIG. 1.

FIGS. 7 and 8 show test cell voltage versus specific capacity for charge and discharge cycles of $Li_xMn_2O_4$ (composition D of Table 1), which was calcined at 800 degrees C. The charge curves (FIG. 7) have two plateaus, one at 4.05 and the other at 4.15 V. The capacities at the two plateaus are equal, with each being about half of the total capacities. The discharge curves (FIG. 8) have two plateaus at 4.05 and 3.95 V, and the capacities at the two plateaus are equal, with each being half of the total discharge capacity. Similar charge and discharge curves for $Li_xMn_2O_4$ samples (composition D of Table 1) calcined at 250 degrees were also tested. However, those curves had lower capacities than the 800 degree C curves. Although the shapes of the 250 degree C curves were similar to those of the 800 degree C curves, the plateaus in the 250 degree C curves were not as obvious.

Figure 9:
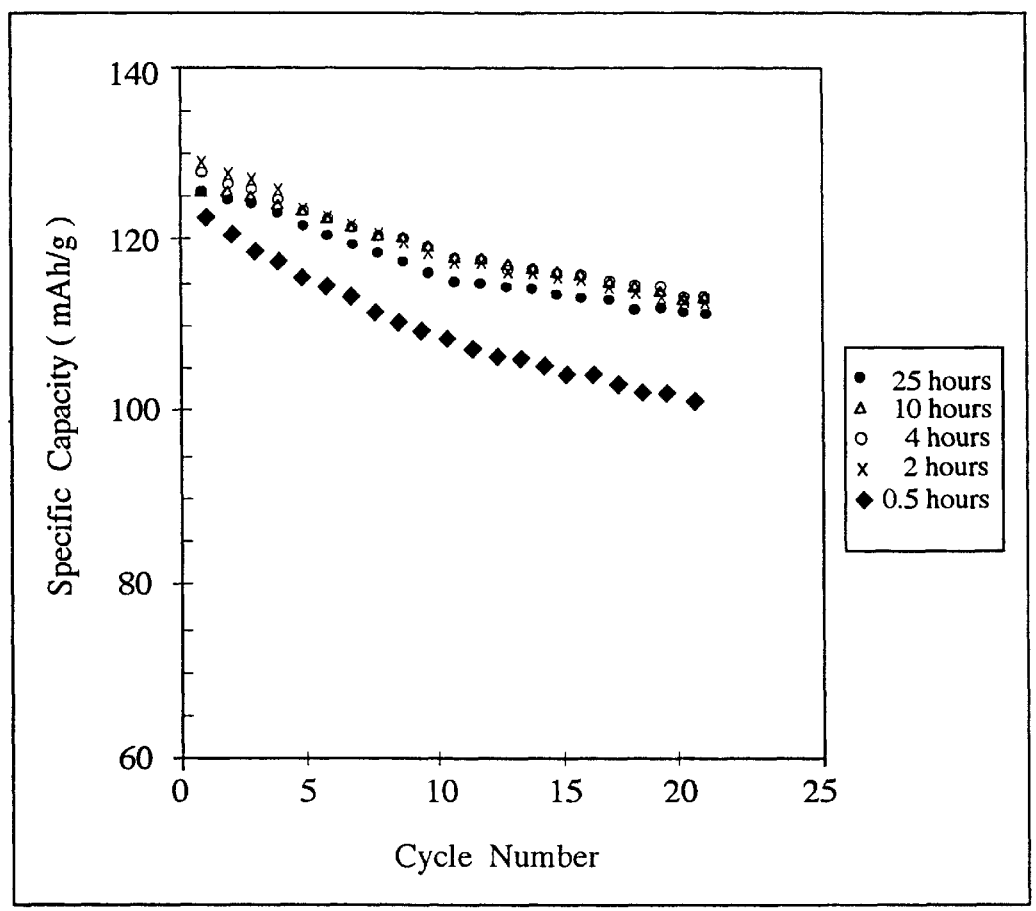
FIG. 9 is a graph of cycle number versus specific capacity of a cell with the composition of $Li_xMn_2O_4$ being produced at a calcination temperature of 800 degrees C. over different calcination times according to the steps shown in FIG. 1.

FIG. 9 is a graph showing the effects of different calcination times in air at 800 degrees C. Composition D (Table 1) was used in the same type of test cell used for the testing shown in FIG. 3. As can be seen in FIG. 9, the best results were obtained from samples heated in the 2–10 hour range. Slightly lower capacity was obtained at 25 hours of calcination. On the other hand, samples calcined only for 0.5 hours showed a rapid decrease in capacity with cycling.

Test Results With Carbon Anode

A button test cell (as described above) was made with $Li_xMn_2O_4$, according to an embodiment of the present invention. The initial Li/Mn ratio of 1.06/2.00 was used, dehydration at 75 degree C, vacuum for 12 hours, and calcination at 800 degrees C. for 4 hours in air. The $Li_xMn_2O_4$ was mixed with 7 wt. % of emulsion of Teflon in water (containing 60 wt. % PTFE), 10 wt. % acetylene black, rolled into a cathode film, and dried at 100 degrees C. in vacuum for 48 hours. Binder #1 was used. Petroleum coke was used as the anode material. It was mixed with 4 wt. % acetylene black and 5 wt. % Teflon solution (containing 60% PTFE), rolled into films with a thickness of about 120 micrometers from which water was removed by heating for 20 hours in vacuum. Electrolyte #II (Table 2) was used, with Celgard 2500 as the separator. Charge and discharge tests were conducted with a current density of 0.30 mA/cm$^2$ in the voltage range of 4.25 to 3.3 V. The results showed that the reversible capacity of the $Li_xMn_2O_4$ was over 125 mAh/g, and that the capacity decay was less than 10 mAh/g at the 10th cycle. The cycling stability in the test cells was better with the petroleum coke than with the lithium metal, due to dendrite problems and electrolyte degradation with the lithium metal.

Figure 10:
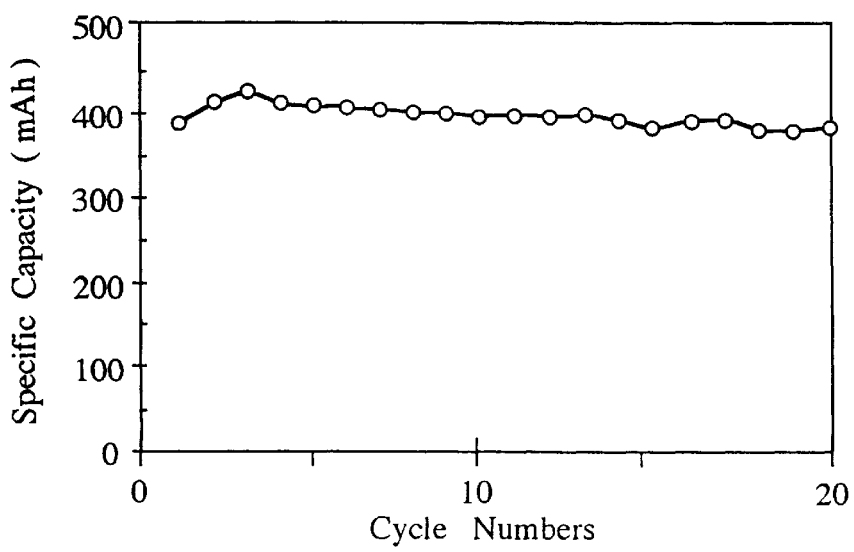
FIG. 10 is a graph of cycle number versus specific capacity for a AA-size battery made with a graphite anode and a $Li_xMn_2O_4$ cathode according to the steps shown in FIG. 1.

Test Results In a AA-Size Lithium-Ion Battery Cell $Li_xMn_2O_4$ was prepared according to an embodiment of the present invention, while using an initial Li/Mn ratio of 1.06/2.00, dehydrated at 75 degrees C. in vacuum for 12 hours, and calcined at 800 degrees C. for 4 hours in air. The $Li_xMn_2O_4$ was mixed with 7 wt. % of an emulsion of Teflon in water (containing 60 wt. % PTFE), 10 wt. % acetylene black, and then rolled into a cathode film. The film was dried at 100 degrees C. in vacuum for 48 hours, and used with binder #I above. The cathode and anode contained 4.2 g of $Li_xMn_2O_4$ and 1.62 g of graphite, respectively. The electrolyte #VIII (Table 2) was used, with Celgard 2400 as a separator. Nickel foam and aluminum mesh were used as the anode and cathode current collectors, respectively, and assembled in a AA-size cell, as is well known in the art. Charge/discharge tests were carried out galvanostatically, with a current of 80 mA in the voltage range of 4.2–3.0 V. The capacity of this test cell was about 400 mAh. The results indicated no obvious capacity decay in 20 cycles at 100% depth of discharge, as shown in FIG. 10.

It should be understood, of course, that the foregoing relates to preferred embodiments of the invention and that modifications may be made without departing from the spirit and scope of the invention as set forth in the following claims.

What is claimed is:

1. A method of preparing a spinel lithium manganese oxide compound, comprising the steps of:

mixing nitrate components;

forming a complex solution from said nitrate components;

dehydrating said complex solution to produce a precursor; and calcining said precursor by heating said precursor at a substantially constant rate of about 3 to 10° C./minute until a holding temperature of at least about 350° C. is reached, wherein said lithium manganese oxide compound is characterized by a particle size distribution between about 3.0 to 5.0 microns.

2. The method of claim 1 wherein said nitrate components comprise lithium and manganese.

3. The method of claim 1 further comprising the step of adding a carboxylic acid to said nitrate components.

4. The method of claim 1 wherein said precursor is produced in the substantial absence of esterification.

5. The method of claim 1 wherein said holding temperature is between about 350° C. and 900° C.

6. A method of preparing a spinel lithium manganese oxide electrode material, comprising the steps of:

forming a citrate complex solution;

dehydrating said citrate complex solution at a dehydrating temperature that ranges from about 40° C. to 150° C. to produce a precursor from said citrate complex solution; and calcining said precursor at a substantially constant rate of heat until reaching a holding temperature between about 350° C. to 900° C.

7. The method of claim 6 wherein said citrate complex solution comprises a lithium compound, a manganese compound, and a carboxylic acid.

8. The method of claim 6 wherein said citrate complex solution is substantially homogeneous in mixture.

9. The method of claim 6 wherein said precursor is characterized as being porous, amorphous, and homogeneous in mixture.

10. The method of claim 6 wherein said calcining step further comprises the steps of pyrolysis and oxidation of said precursor.

11. A method of preparing spinel lithium manganese oxide for a lithium-ion battery, comprising the steps of:

forming a citrate complex solution comprising lithium nitrate, manganese nitrate, and citric acid;

dehydrating said citrate solution at a dehydrating temperature that is between about 40° C. to 150° C.;

producing an amorphous precursor from said citrate solution;

heating said precursor at a substantially constant rate between about 3 to 10° C./minute; and maintaining a holding temperature about said precursor at about 350° C. to 900° C.

wherein said lithium manganese oxide is characterized by a formula $Li_xMn_yO_4$ in which "x" ranges from about 0.93 to 1.06 and "y" ranges from about 1.94 to 2.03.

12. The method of claim 11 wherein said citrate complex solution consists essentially of lithium nitrate, manganese nitrate, citric acid, and water.

13. The method of claim 11 wherein said citrate complex solution comprises lithium and maganese in an atomic ratio in the range of about 0.4 to 0.7.

14. The method of claim 13 wherein said atomic ratio is about 0.55.

15. The method of claim 11 wherein said citrate complex solution is formed from a molar ratio of citric acid to the combined lithium and manganese, said ratio being about 0.5 to 1.5.

16. The method of claim 15 wherein said molar ratio is about 1.0.

17. The method of claim 11 wherein said dehydrating step occurs at about 75° C. for about 12 hours and under a pressure of about 0.1 to 0.01 mm of Hg.

18. The method of claim 11 wherein said rate of heating is between about 3.0 to 5.0° C./minute.

19. The method of claim 11 wherein said heating step creates said holding temperature at about 800° C. and said maintaining step maintains said holding temperature for about 4 hours.

* * * * *